(12) United States Patent
Claussen et al.

(10) Patent No.: US 8,793,807 B2
(45) Date of Patent: Jul. 29, 2014

(54) CONTROLLING ACCESS TO AND MANIPULATION OF A DATA OBJECT BY DIFFERENT DATA OBJECT USERS

(75) Inventors: Shane C. Claussen, Austin, TX (US); Vladimir Klicnik, Oshawa (CA); Matthias Kloppmann, Sindelfingen (DE); Dieter Koenig, Herrenberg (DE); Simon D. Moser, Stuttgart (DE); Prabir Nandi, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/987,099

(22) Filed: Jan. 8, 2011

(65) Prior Publication Data

US 2011/0247080 A1  Oct. 6, 2011

Related U.S. Application Data

(60) Provisional application No. 61/320,537, filed on Apr. 2, 2010.

(51) Int. Cl.
*H04L 9/32* (2006.01)
*G06F 21/62* (2013.01)

(52) U.S. Cl.
CPC .................................. *G06F 21/6218* (2013.01)
USPC ................................................. 726/28; 726/1

(58) Field of Classification Search
CPC .................................................... G06F 21/6218
USPC ............................ 719/315, 316; 715/236–239
See application file for complete search history.

(56) References Cited

U.S. PATENT DOCUMENTS

| | | | |
|---|---|---|---|
| 8,161,460 B2* | 4/2012 | Drumm et al. | 717/126 |
| 8,181,243 B2* | 5/2012 | Wallace et al. | 726/21 |
| 8,266,117 B2* | 9/2012 | Hatakeyama et al. | 707/694 |
| 2003/0093328 A1* | 5/2003 | Koons | 705/26 |
| 2007/0061324 A1* | 3/2007 | Morris | 707/9 |
| 2007/0113187 A1* | 5/2007 | McMullen et al. | 715/742 |
| 2007/0282923 A1* | 12/2007 | Ward et al. | 707/203 |
| 2007/0299796 A1* | 12/2007 | Macbeth et al. | 706/16 |
| 2009/0006167 A1* | 1/2009 | Toussaint et al. | 705/8 |
| 2010/0107165 A1* | 4/2010 | Koskimies et al. | 718/100 |
| 2011/0023082 A1* | 1/2011 | Narasinghanallur et al. | 726/1 |
| 2011/0219425 A1* | 9/2011 | Xiong et al. | 726/1 |
| 2011/0225125 A1* | 9/2011 | Colgrave | 707/689 |
| 2011/0238650 A1* | 9/2011 | Jenkins et al. | 707/706 |
| 2011/0246530 A1* | 10/2011 | Malafsky | 707/794 |
| 2012/0130758 A9* | 5/2012 | Morinville | 705/7.12 |

* cited by examiner

*Primary Examiner* — Haresh N Patel
(74) *Attorney, Agent, or Firm* — Ido Tuchman; William J. Stock

(57) ABSTRACT

A method, system, and computer program product for controlling access to and manipulation of a data object by different data object users. An example method includes determining a current user role of a current user requesting interaction with the data object. The method also includes determining a current lifecycle state of the data object. The method further includes restricting, by a computer processor, interaction with the data object by the current user based on at least the current user role of the current user and the current lifecycle state of the data object.

19 Claims, 17 Drawing Sheets

```
<businessEntity >
    name="NCName" 1
    <information="QName" ? />        702
        <primaryKey>
            keyAttribute="xsd:string" *    704
        </primaryKey> ?
    <lifecycle>
        <states initialState="NCName">NCNameList</states> 1
        <transitions> 1
            <transition
                name="NCName" 1
                fromState="NCName" ?
                toState="NCName" 1
                <transition /> *           706
        </transitions> 1
    </lifecycle> 1
    <accessPolicies>
        <roles>NCNameList</roles> 1
        <accessPolicy
            roles="NCNameList" 1
            states="NCNameList" ?
            <accessEntry>
                dataOperations=" DataOperationList" 1
                attribute | transition="xsd:NCName" +    708
                condition="xsd:string" ?
            </accessEntry> *
        </accessPolicy> *
    </accessPolicies> 1
    <events>
        stateTransition | dataChange="xsd:NCName" +    710
    </events> ?
</businessEntity> 1
```

Fig. 7

```
<accessPolicy name="BillReadyTransition" roles="OriginatingCustomer">
    <accessEntry dataOperations="execute">
        <!-- if the data operation is "execute" then expect a transition -->
        <attributeOrTransition>CreatedToReady</attributeOrTransition>
        <!-- The condition is effectively a transition guard -->
        <condition>fn:exists(/@inf:recipientInformation)</condition>
    </accessEntry>
</accessPolicy>
```

Fig. 8

```
<events>
 .....
 <stateTransition transition="CreatedToReady"/>
 <dataChange dataOperation="update" attribute="/inf:recipientInformation"/>
</events>
```

Fig. 9

```xml
<?xml version="1.0" encoding="UTF-8"?>
<businessEntity name="CourierShipmentBill" targetNamespace="http://example.com/businessEntities"
    xmlns:be="http://example.com/businessEntities" xmlns:inf="http://example.com/information"
    xmlns="http://www.ibm.com/bedl" xmlns:xsi="http://www.w3.org/2001/XMLSchema-instance"
    xsi:schemaLocation="http://www.ibm.com/bedl bedl.xsd">
    <informationModel>inf:courierShipmentBill</informationModel>                      — 702
    <primaryKey>
        <keyAttribute>/@inf:shipmentID</keyAttribute>
    </primaryKey >      — 704
    <lifecycle>
        <states initialState="Created">Created Ready Picked Transit Delivered Done</states>
            <transitions>
                <transition name="CreatedToReady" fromState="Created" toState="Ready"/>
                <transition name="ReadyToPicked" fromState="Ready" toState="Picked"/>
                <transition name="ReadyToTransit" fromState="Ready" toState="Transit"/>
                <transition name="PickedToTransit" fromState="Picked" toState="Transit"/>
                <transition name="TransitToDelivered" fromState="Transit" toState="Delivered"/>
                <transition name="DeliveredToDone" fromState="Delivered" toState="Done"/>
            </transitions>
    </lifecycle>                   — 706
    <accessPolicies>
        <!-- mandatory definition of roles -->
        <roles>OriginatingCustomer PickupDriver TransitDriver DistributionCenter ReceivingCustomer</roles>
        <!-- one or more access policy elements, containing one or more roles and zero or more states -->
        <accessPolicy name="CustomerBillCreation" roles="OriginatingCustomer" states="Created">
            <accessEntry dataOperations="update">
                <!-- zero or more attributes -->
1004            <attributeOrTransition>/inf:recipientInformation</attributeOrTransition>
            </accessEntry>
        </accessPolicy>
        <accessPolicy name="BillReadyTransition" roles="OriginatingCustomer">
            <accessEntry dataOperations="execute">
                <!-- if the data operation is "execute" then expect a transition -->
                <attributeOrTransition>CreatedToReady</attributeOrTransition>
                <!-- The condition is effectively a transition guard -->
                <condition>fn:exists(/@inf:recipientInformation)</condition>
            </accessEntry>
        </accessPolicy>
        <accessPolicy name="InTransitPlatinum" roles="OriginatingCustomer" states="Transit">
            <accessEntry dataOperations="read update">
                <!-- zero or more attributes -->
                <attributeOrTransition>/inf:recipientInformation</attributeOrTransition>
                <attributeOrTransition>/inf:billingInformation</attributeOrTransition>
                <!-- zero or one condition -->
                <condition>/@inf:customerType="Platinum Customer"</condition>
            </accessEntry>
        </accessPolicy>
        <accessPolicy name="InTransitBasic" roles="OriginatingCustomer" states="Transit">
            <accessEntry dataOperations="read">
                <attributeOrTransition>/inf:recipientInformation</attributeOrTransition>
                <condition>/@inf:customerType="Basic Customer"</condition>
            </accessEntry>
        </accessPolicy>              — 710
    </accessPolicies>
    <events>
        <stateTransition transition="CreatedToReady"/>
        <dataChange dataOperation="update" attribute="/inf:recipientInformation"/>
    </events>
</businessEntity>
```

*Fig. 10*

```
<?xml version="1.0" encoding="UTF-8"?>
<process name="CreateShippingBill"
targetNamespace="http://example.com/processes/createShippingBill"
xmlns:bpel="http://docs.oasis-open.org/wsbpel/2.0/process/executable"
xmlns="http://docs.oasis-open.org/wsbpel/2.0/process/executable"
xmlns:plt="http://example.com/services/createShippingBill"
xmlns:b4d="http://www.ibm.com/bpel4data"
xmlns:be="http://example.com/businessEntities"
xmlns:inf="http://example.com/information"
xmlns:xsi="http://www.w3.org/2001/XMLSchema-instance"
xsi:schemaLocation="http://docs.oasis-open.org/wsbpel/2.0/process/executable
http://docs.oasis-open.org/wsbpel/2.0/OS/process/executable/ws-bpel_executable.xsd
http://www.ibm.com/bpel4data BPEL4Data.xsd">
    <extensions>
1102    <extension namespace="http://www.ibm.com/bpel4data" mustUnderstand="yes"/>
    </extensions>
    <partnerLinks>
        <partnerLink partnerLinkType="plt:customerPLT" name="customerPL"/>
        <partnerLink partnerLinkType="plt:servicesPLT" name="servicesPL"/>
    </partnerLinks>
    <variables>
        <variable name="shippingBill" element="inf:courierShipmentBill"/>
    </variables>
    <sequence>
        <receive partnerLink="customerPL" operation="createShippingBill" variable="shippingBill">
            <b4d:create businessEntity="be:CourierShipmentBill" newState="Created"/>
1106    </receive>
        <assign>
            <b4d:update businessEntity="be:CourierShipmentBill"/>
1104        <copy>
                <from>"Basic Customer"</from>
                <to>$shippingBill/@customerType</to>
            </copy>
        </assign>
        <invoke partnerLink="servicesPL" operation="storeShippingBill"
inputVariable="shippingBill">
            <b4d:execute businessEntity="be:CourierShipmentBill" newState="Ready"/>
        </invoke>
        <reply partnerLink="customerPL" operation="createShippingBill" variable="shippingBill"/>
    </sequence>
</process>
```

*Fig. 11*

CONTROLLING ACCESS TO AND MANIPULATION OF A DATA OBJECT BY DIFFERENT DATA OBJECT USERS

CROSS-REFERENCE TO RELATED APPLICATIONS

This application claims priority under 35 U.S.C. §120 to U.S. Provisional Patent Application No. 61/320,537 filed on Apr. 2, 2010, the entire text of which is specifically incorporated by reference herein.

BACKGROUND

This invention involves the management of processes and their related data. Specifically, the invention involves using lifecycle and user role information to control the implementation of processes and their related data.

The specification and deployment of business processes and operations is crucial to the successful management of medium or large-scale enterprises. Business Entities provide a basis for specifying business operations that combines data and process at a fundamental level.

Business Entities are business-relevant dynamic conceptual objects that are created, evolved, and (typically) archived as they pass through the operations of an enterprise. A Business Entity includes both an information model for data about the business objects during their lifetime and a lifecycle model, which may describe the possible ways and timings that tasks can be invoked and performed on these objects. An example of a Business Entity type is Courier Shipment, whose information model would include attributes for package ID, sender, recipient, shipping method, arrival times, delivery time, and billing information. The lifecycle model would include the multiple ways that the package could be delivered and paid for, and would be used in tracking each instance of the Courier Shipment Business Entity type. Other examples of Business Entities are a Claim in an Insurance Claims process, going through the states of Filed, Approved, Fulfilled, and so on; Trouble Ticket for a Services Delivery process, going through the lifecycle states of Opened, Assigned, Rejected; financial Deal in a loan-giving organization, going through the lifecycle states of Draft, Offered, Signed, Active, and so on.

Business Entities define a useful way to understand and track business operations, such as the locations that the package has passed through and its arrival times, and the distribution of timings (for example, how many two-day air shipments took longer than two days in the last week) and ways of handling (for example, what percentage of cash-on-delivery shipments required more than one delivery attempt), which are useful for monitoring, dashboards, and more broadly, business intelligence. More generally, Business Entity types can provide a unifying basis for understanding many aspects around the operations of an enterprise, including requirements gathering, business rules, compliance, and process user interactions.

BRIEF SUMMARY

Embodiments of the present invention described below introduce the idea of Business Entities while still using and building upon standards such as Web Service Business Process Execution Language ("WS-BPEL") and Business Process Modeling Notation ("BPMN"). This enables the use of Business Entities in conjunction with the large industrial investment in, and vast embedded base of, tooling for these process-centric approaches. A new proposed specification, called Business Entity Definition Language ("BEDL"), describes how Business Entities can be used alongside process-centric technologies such as WS-BPEL and BPMN.

An example embodiment of the present invention is a method of controlling access to and manipulation of a data object by different data object users. The method includes determining a current user role of a current user requesting interaction with the data object. The current user role may be one of a set of defined user roles for accessing and manipulating the data object. The method also includes determining a current lifecycle state of the data object. The current lifecycle state may be one of a set of states the data object can transition to. The method further includes restricting, by a computer processor, interaction with the data object by the current user based on at least the current user role of the current user and the current lifecycle state of the data object.

Another example embodiment of the invention is a system configured to control access to and manipulate a data object by different data object users. The system includes a computer processor configured to store a current user role of a current user requesting interaction with the data object. The current user role may be one of a set of defined user roles for accessing and manipulating the data object users. The computer processor is also configured to store a current lifecycle state of the data object. The current lifecycle state may be one of a set of finite lifecycle states the data object can transition to. The system further includes the computer processor configured to restrict interaction with the data object by the current user based on at least the current user role of the current user and the current lifecycle state of the data object.

Yet another example embodiment of the invention is a computer program product for controlling access to and manipulation of a data object by different data object users. The computer program product includes a computer readable storage medium having computer readable program code embodied therewith. The computer readable program code is configured to determine a current user role of a current user requesting interaction with the data object. The current user role may be one of a set of defined user roles for accessing the data object. The computer readable program code is also configured to determine a current lifecycle state of the data object. The current lifecycle state may be one of a set of states the data object can transition to. The computer readable program code is further configured to restrict interaction with the data object by the current user based on at least the current user role of the current user and the current lifecycle state of the data object.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 shows the general form of a BEDL document that specifies the properties of a business entity.

FIG. 8 shows an example access policy encoded in BEDL through the access policy tag.

FIG. 9 shows an example notification encoded in BEDL through the events tag.

FIG. 10 shows an example Business Entity encoded in BEDL.

FIG. 11 shows an example BPEL document incorporating BEDL elements through the use of the BPEL4Data extension.

DETAILED DESCRIPTION

The present invention is described with reference to embodiments of the invention. Throughout the description of the invention reference is made to FIGS. 1-17.

As discussed in detail below, embodiments of the present invention include a method, system, and computer program product to access and manipulate a data object according to the lifecycle state of a data object and the user role of the user attempting to access the data.

Figure 1:
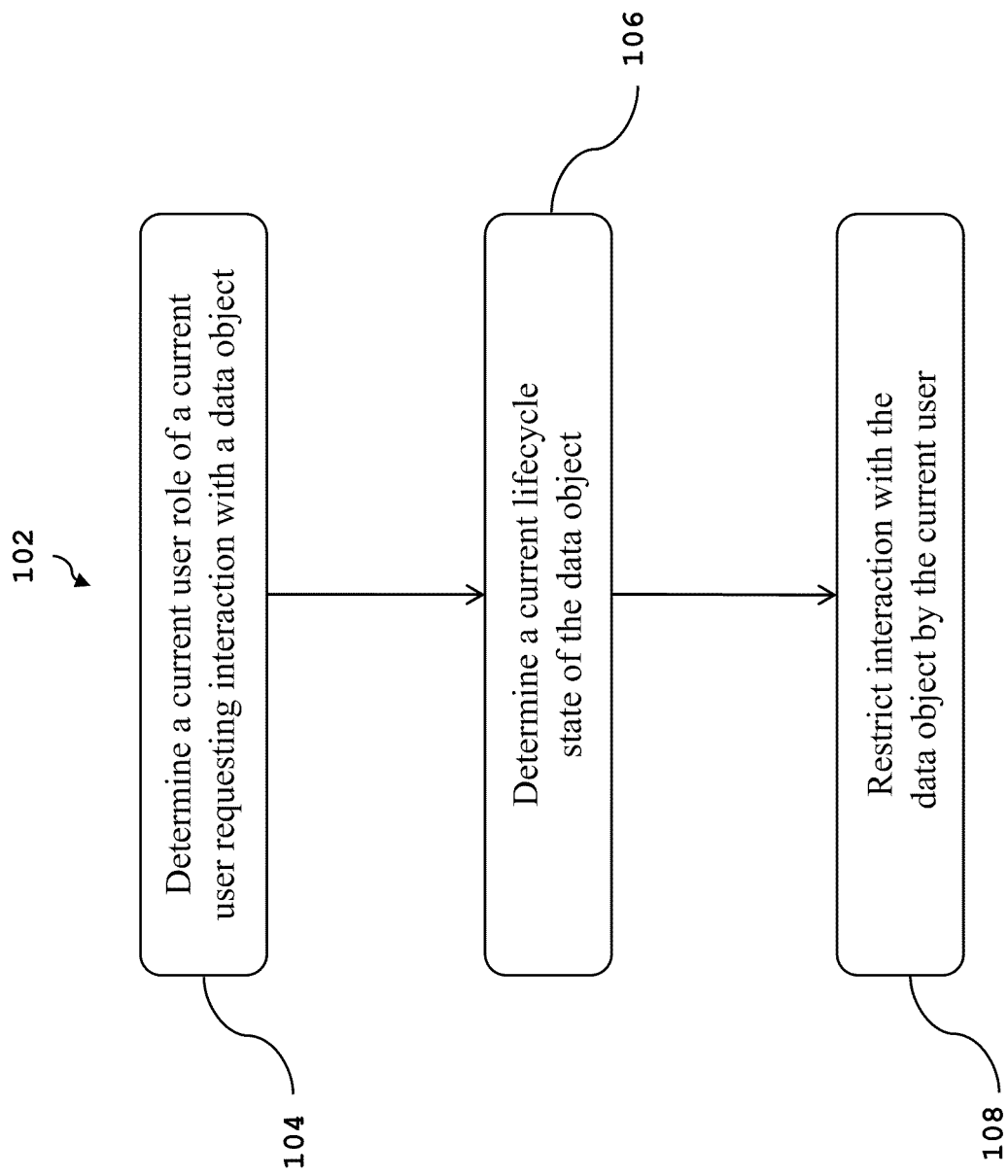
FIG. 1 shows an example embodiment of a method of controlling access to and manipulation of a data object.

FIG. 1 shows an example embodiment of a method of controlling access 102 to and manipulation of a data object by different data object users. The method 102 may include determining a current user role 104 of a current user requesting interaction with the data object. The current user role may be one of a set of defined user roles for accessing and manipulating the data object. The method may also include determining a current lifecycle state 106 of the data object. The current lifecycle state may be one of a set of finite lifecycle states the data object can transition to. The method may further include restricting, by a computer processor, interaction with the data object 108 by the current user based on at least the current user role of the current user and the current lifecycle state of the data object.

The set of user roles in method 102 may be categories of agents that can access data associated with the data object and that can change the lifecycle states of the data object. Additionally, the computer processor, the data object, data object user, the set of lifecycle states, and user roles may be together configured to control the implementation of a business process.

To facilitate the method of controlling access 102 to and manipulation of a data object, the idea of Business Entities ("BE") may be introduced and expressed through a Business Entity Definition Language ("BEDL"). In general, when a Business Entity instance is first created, only a fraction of its attributes have values. As the BE instance moves through the enterprise, some attribute values are updated and others are populated. In some cases an attribute might be populated for some but not all of the BE instances of the type. For example, the attribute for Customer Interaction Info might remain uninitialized for shipments by senders who do not contact the shipper after dropping off the package.

Figure 2:
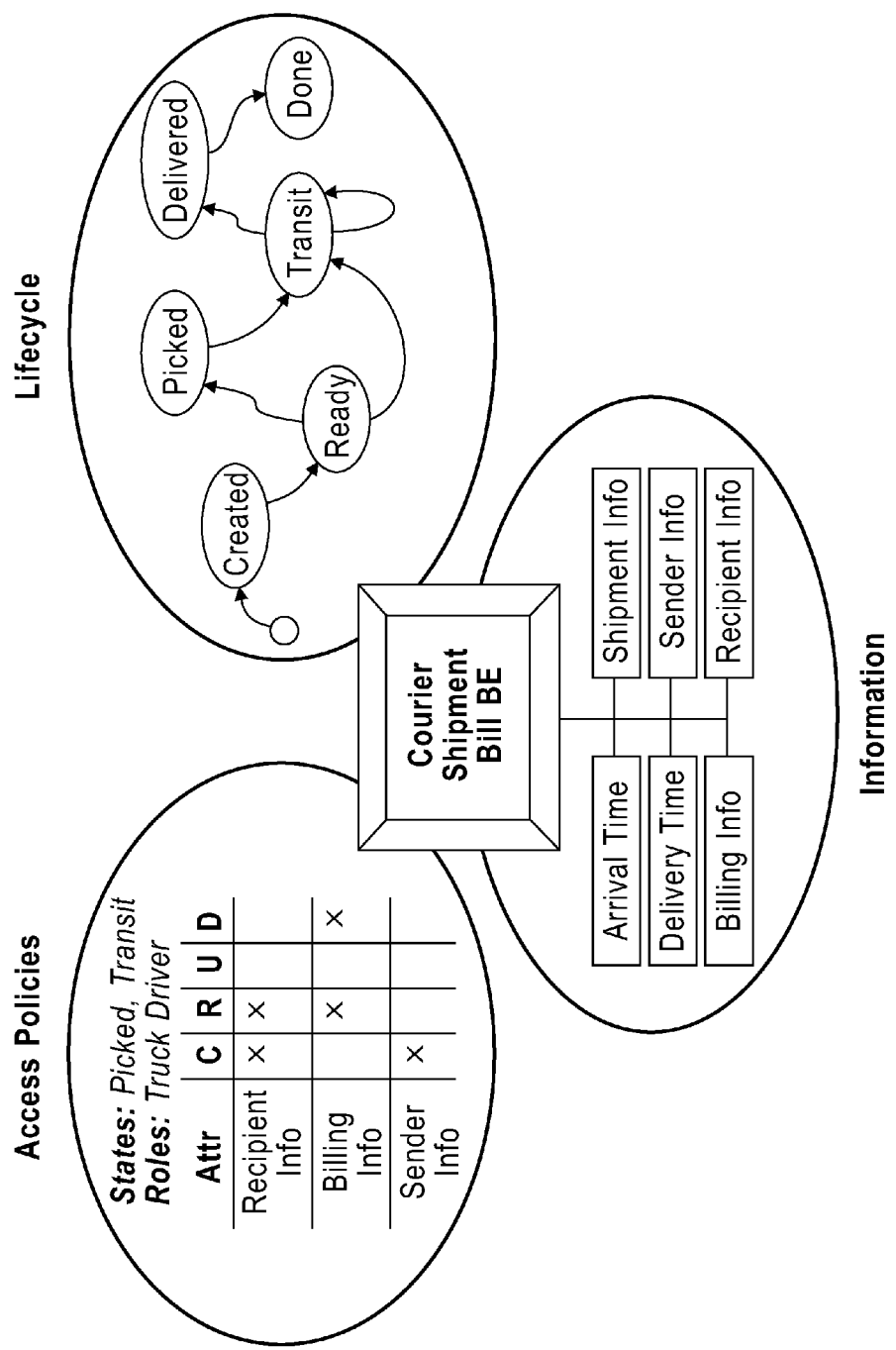
FIG. 2 shows an example representation of potential elements of a Business Entity, which, in this example, is a Courier shipment Bill.

In BEDL, the lifecycle model for Business Entities is specified as a finite state machine. In the lifecycle model for the Courier Shipment BE type, there are six states along with a unique initial state, which is present in all lifecycle models. FIG. 2 shows an representation of potential elements of a Business Entity, which, in this example, is a Courier shipment Bill. As shown in FIG. 2, a Courier Shipment BE instance can move from the initial state to Draft or to the state Ready. Intuitively, the BE instance can be in the Ready state if the Sender Info and Recipient Info, along with a plan for payment are recorded. The Draft state corresponds to the case where a Courier Shipment is initiated, but there is some delay in getting all of the information needed before moving into the Ready state. The other states and transitions in the lifecycle for the Courier Shipment type are largely self-explanatory. The package might have been brought into a shipping office, in which case the corresponding BE instance will move directly into the Transit state. Otherwise, it will move into the Picked state when it has been picked up from the sender, and then into the Transit state.

Although not illustrated in FIG. 2, directed loops of transitions involving multiple states are permitted. Also, in this state machine model, self-loops are implicit. These arise when a process leaves a BE instance in the same state. This might arise with a Courier Shipment instance, for example, when it is in the Transit state, and information is included about which truck it is on for what time interval and which holding location it is in for what time interval, or which plane it is on, and so on. A self-loop might also arise when new billing information arrives (for example, if the payment processing was COD or performed on monthly basis).

In BEDL, the lifecycle specification itself may not provide detail on the activities that might be performed while a Business Entity instance is in a given state, nor the activities that might be performed as part of transitioning a Business Entity instance from one state to another. A BEDL specification may typically be accompanied by a Web Service Business Execution Language or other business process specification that focuses on the processing aspect of an overall Business Operation Model.

Figure 3:
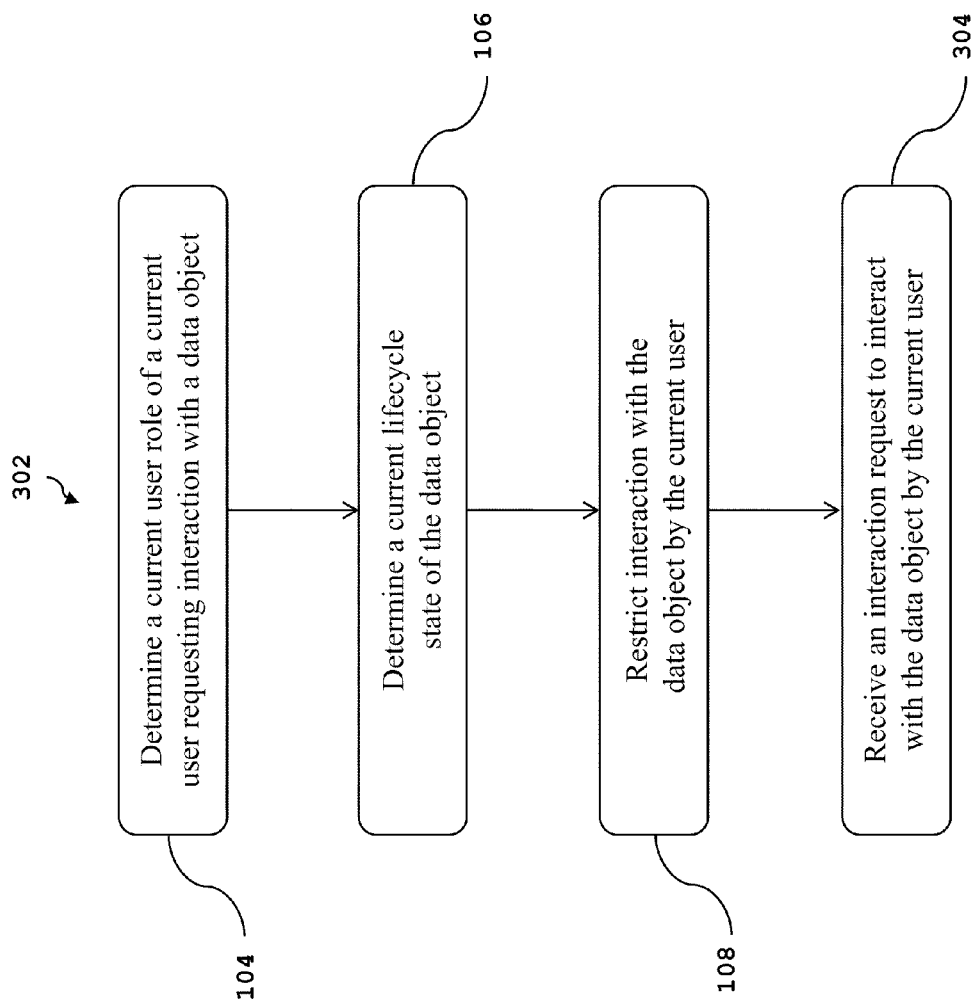
FIG. 3 shows an example embodiment of the method of FIG. 1 with the additional step of receiving an interaction request to interact with the data object by the current user.

FIG. 3 shows an example embodiment of a method 302 that includes method 102 and may include the additional step of receiving an interaction request 304 to interact with the data object by the current user. The interaction request may include an interaction type, which may be one of a set of interaction types. Additionally, restricting interaction 108 with the data object by the current user may be further based on the interaction type of the interaction request.

The set of interaction types in method 302 may include creating data associated with the data object, reading data associated with the data object, updating data associated with the data object, deleting data associated with the data object, and transitioning the data object to a different lifecycle state.

Figure 4:
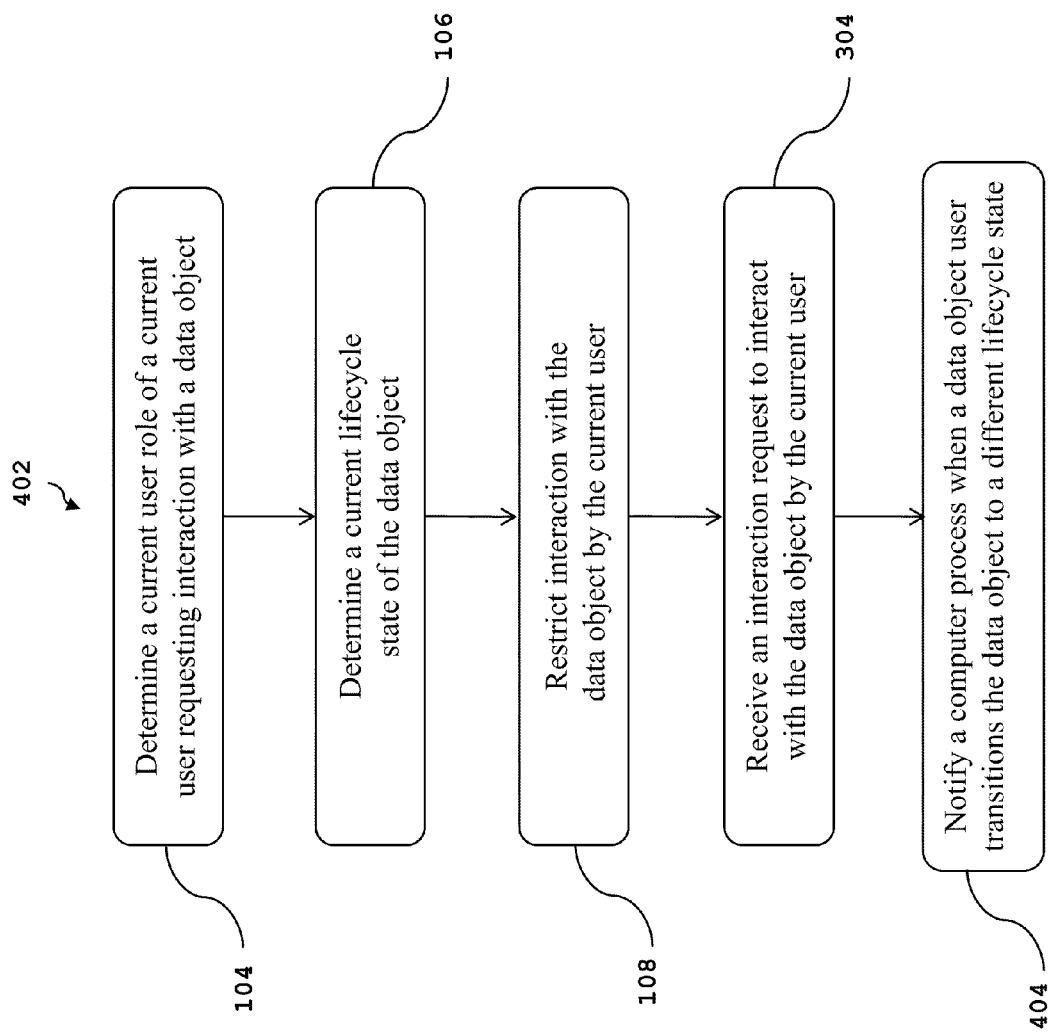
FIG. 4 shows an example embodiment of the method of FIG. 3 with the additional step of notifying a computer process when a data object user transitions the data object to a different lifecycle state.

FIG. 4 shows an example embodiment of a method 402 that includes method 302 and may include the additional step of notifying 404 a computer process when a data object user transitions the data object to a different lifecycle state.

Figure 5:
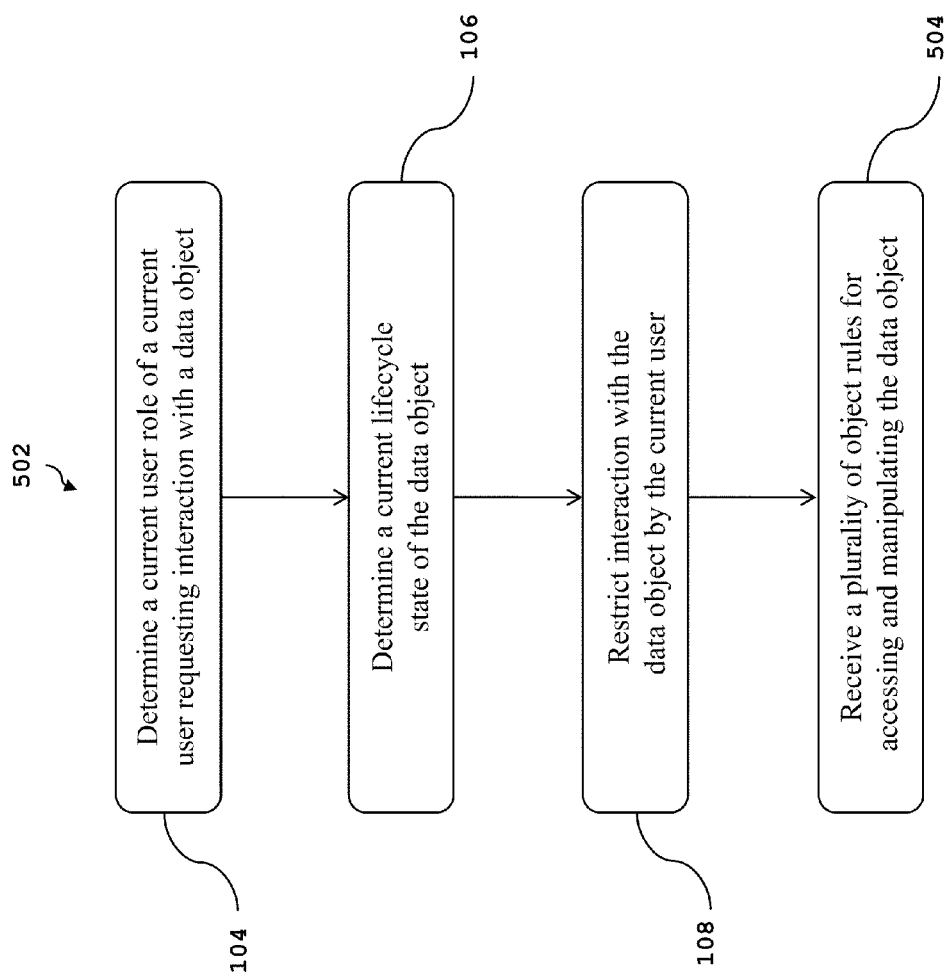
FIG. 5 shows an example embodiment of the method of FIG. 1 with the additional step of receiving a plurality of object rules for accessing and manipulating the data object.

FIG. 5 shows an example embodiment of a method 502 that includes method 102 and may include the additional step of receiving a plurality of object rules 504 for accessing and manipulating the data object based on the set of defined user roles and the set of finite lifecycle states. Additionally, restricting interaction 108 with the data object by the current user may include searching the object rules that apply to the current user role of the current user and the current lifecycle state of the data object.

The plurality of object rules may be included in BE type through the specification of access policies. There may be two focus areas for these policies: CRUD in connection with Creates, Reads, Updates, and Deletes of attribute values in the information model, and Executions of state transitions in the lifecycle model. We sometimes refer to the collection of these two types of access policies as CRUDE policies.

The CRUD restrictions may focus on what roles have authority to modify attribute values. These restrictions may be keyed not only by attribute and role, but also by the state that a BE instance is in. You can see this in FIG. 2, where the CRUD matrix for the role TruckDriver is shown for the states Picked and Transit. Although not illustrated in FIG. 2, a CRUD restriction may also include a guard, or condition, based on the attribute values of the BE instance. For example, a TruckDriver might be permitted to update the Sender Info only if the Transit Info indicates that the truck is scheduled to go, or has gone, to the sender's address. The CRUD restrictions may be enforced in connection with processes that attempt to access BE instance attributes, and also in connection with notifications in response to subscriptions.

Similar to the CRUD policies, the Execution policies involve two components. First, an Execution policy can specify which transitions can be invoked by a given role. Second, similar to a CRUD policy, an Execution policy may include a guard, or condition, that must be satisfied in order to transition from one state to another. For example, it may be specified that a Courier Shipment instance cannot move to the Ready state unless the Sender Info and Recipient Info are populated.

Figure 6:
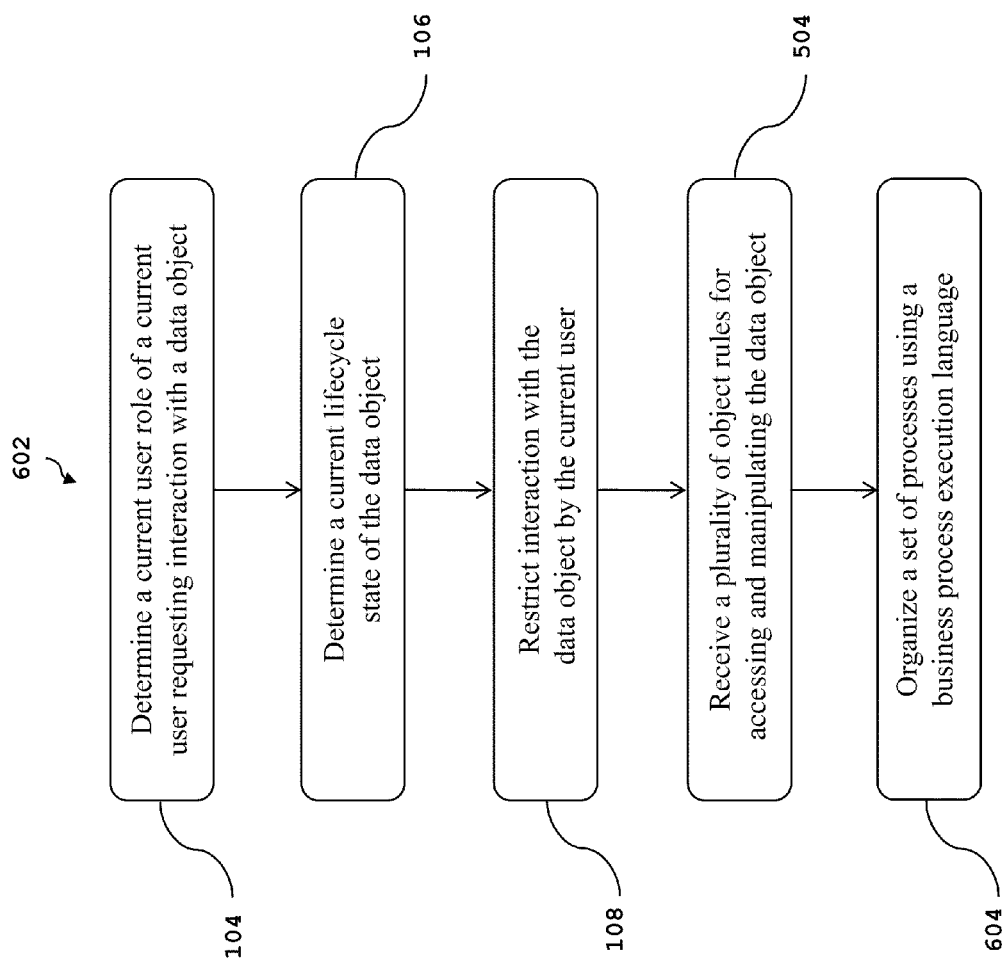
FIG. 6 shows an example embodiment of the method of FIG. 5 in which the set of user roles, the set of lifecycle states, and plurality of object rules may be encoded and associated with a data object through a computer markup language.

FIG. 6 shows an example embodiment of a method 602 that includes method 502. In method 602, however, the set of user roles, the set of lifecycle states, and plurality of object rules may be encoded and associated with a data object through a computer markup language. An example computer markup language that may be used is Business Entity Definition Language, but those of ordinary skill in the art will recognize that various forms of XML or other known computer languages may also be used.

FIG. 7 shows the general form of a BEDL document that specifies the properties of a business entity. The cardinality of the various elements can be interpreted as follows: "?" represents zero or one occurrence, "*" represents zero or more occurrences, "+" represents one or more occurrences, and no specification represents exactly one occurrence.

A Business Entity may contain a lifecycle, an optional reference to an information model, and an optional set of access policies and notifications. The following is a detailed explanation of the various tags that may comprise a Business Entity encoded in BEDL. The information tag 702, may contain a reference to an informational model, potentially encoded in an XML schema. The schema may have attributes and other child elements with the Business Entity type at the root. Those of ordinary skill in the art will recognize a variety of means for storing information in an XML schema.

In the primaryKey tag 704, one or more attributes in the information model can be assigned to the primaryKey list for the BE. Together this attribute or set of attributes may form a unique key for the BE type.

In the lifecycle tag 706, the lifecycle is represented by a set of states and transition elements. The states may include a flat list of state names with one designated as the initial state. When a BE instance is created, it may transition from the designated initial state into one of the states reachable in one step from the initial state. A transition may have a name, an optional fromState and a toState. If the fromState is unspecified, this indicates that a transition to the toState is allowable from any state. Note that this is purely a convenience feature. However, if there exists a transition for fromState to toState, in addition to a transition element with just the toState, the former may override the latter for all processing purposes.

In the access polices tag 708, an access policy may be specified for a set of roles and states. It contains a set of access entries. An access entry is a grouping of dataOperations, attributes or transitions, and conditions. The dataOperations may be one of five types: create, read, update, delete and execute. In the case of execute, the target is a transition that means that this set of transitions is allowed by these roles if the set of conditions are met. Following is an example of an execute access policy. In this example, shown in FIG. 8, the transition DraftToReady is allowed only if executed by the OriginatingCustomer role and the condition Recipient Information has a value fn:exists. The default expression language syntax to specify conditions is XPath/XQuery. For all other dataOperations, the access entry target is a set of data attributes. One additional nuance is that only read and update are applicable for simple attributes, whereas for complex attributes, all dataOperations are applicable.

In the events tag 710, notifications may be used to indicate the intent of Business Entities to broadcast to interested parties, a state or data change. Each notification entry may specify the transition or data operation. In case of a data operation, the corresponding data attribute can also be optionally specified. In the example shown in FIG. 9, a notification will be sent whenever the recipientInformation is updated or when the Courier Shipment Bill transitions from the Created to the Ready state.

FIG. 10 shows an example Business Entity encoded in BEDL. It is an example of how the Courier Shipment Bill Business Entity, depicted abstractly in FIG. 2, may be encoded in BEDL. In this example, the set of user roles may be defined in the roles tag 1004. The set of lifecycle states may be defined under the lifecycle tag 706. The plurality of object rules may be defined in the access policies tag 708. The notifications may be defined in the events tag 710. These elements may be associated with a data object through the information model tag 702.

Returning to FIG. 6, method 602 may also include the additional step of organizing 604 a set of processes using a language for executable business processes, which may be extended to incorporate the computer markup language. One such type is called Web Service Business Process Execution Language ("WS-BPEL"). One example of using WS-BPEL and extending it to incorporate a computer markup language is through the use of BPEL4Data. BPEL4Data may extend WS-BPEL to incorporate Business Entities encoded in BEDL. BPEL4Data is a declarative extension to WS-BPEL that has been developed so that WS-BPEL processes can work easily with BE definitions expressed in BEDL. BPEL4Data may contain the extensions to WS-BPEL to formally consume BEDL elements. Specifically, it may provide a declarative syntax for annotating a WS-BPEL activity to either specify a BE state change or to indicate BE content manipulation. Those of ordinary skill in the art will recognize that similar techniques may be applied to a variety of languages for executable business processes incorporating a computer markup language with the functionality described above.

FIG. 11 shows a sample WS-BPEL document incorporating BEDL elements through the use of the BPEL4Data extension. The boxed segments of code in the figure indicate lines of code using the BPEL4Data extension. The extension tag 1102 may extend WS-BPEL to include statements made in BPEL4Data. The b4d tag 1104 may be used to incorporate business entities encoded in BEDL. The create command 1106 is used, for example, to create a new BE called Courier Shipment Bill, which is given an initial lifecycle state of Created. As shown in FIG. 11, various other functions such as the update and execute commands may be used and appreciated by those of ordinary skill in the art.

Figure 12:
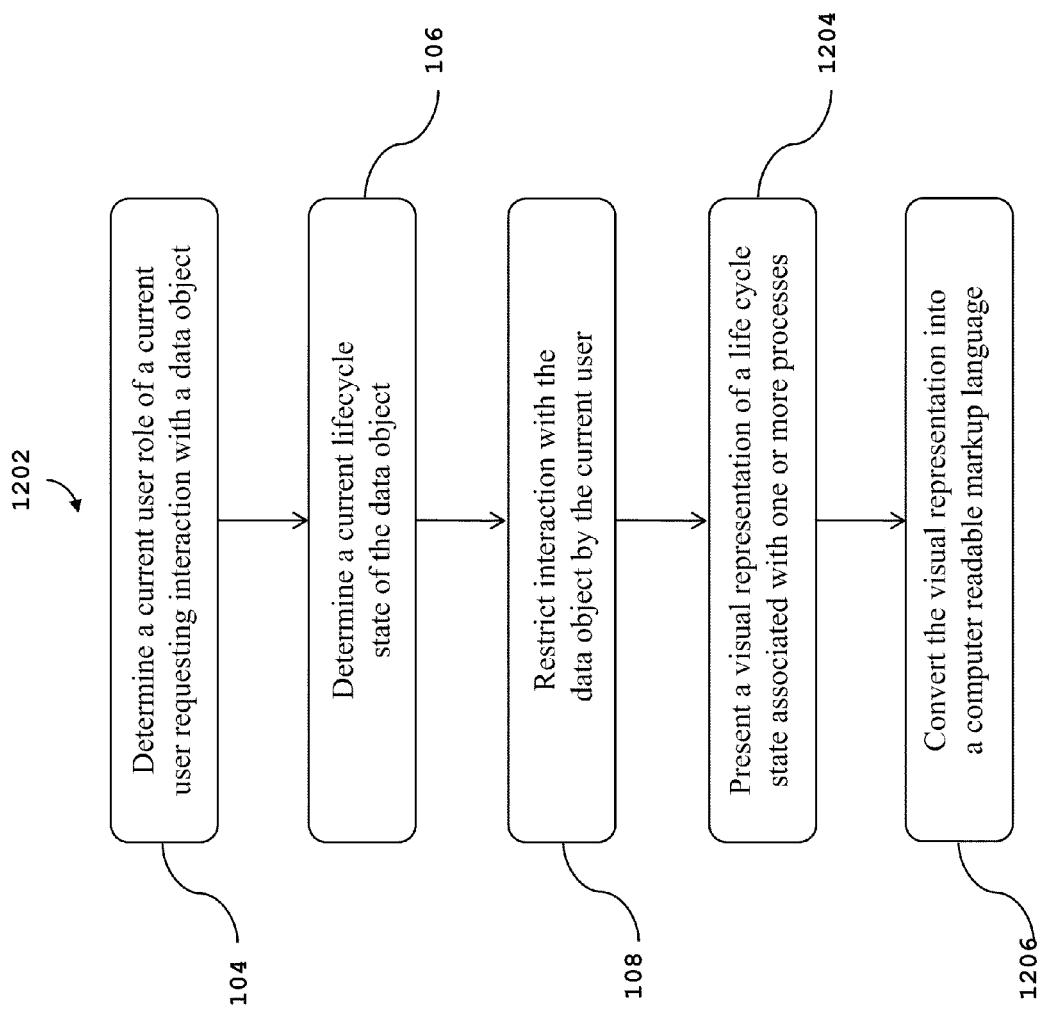
FIG. 12 shows an example embodiment of the method of FIG. 1 with the additional step of presenting a visual representation of a lifecycle state associated with one or more processes.

FIG. 12 shows an example embodiment of a method 1202 that includes method 102 and may include the additional step of presenting 1204 a visual representation of a lifecycle state associated with one or more processes. An embodiment of method 1202 may additionally include the step of converting 1206 the visual representation into a computer readable markup language.

Figure 13:
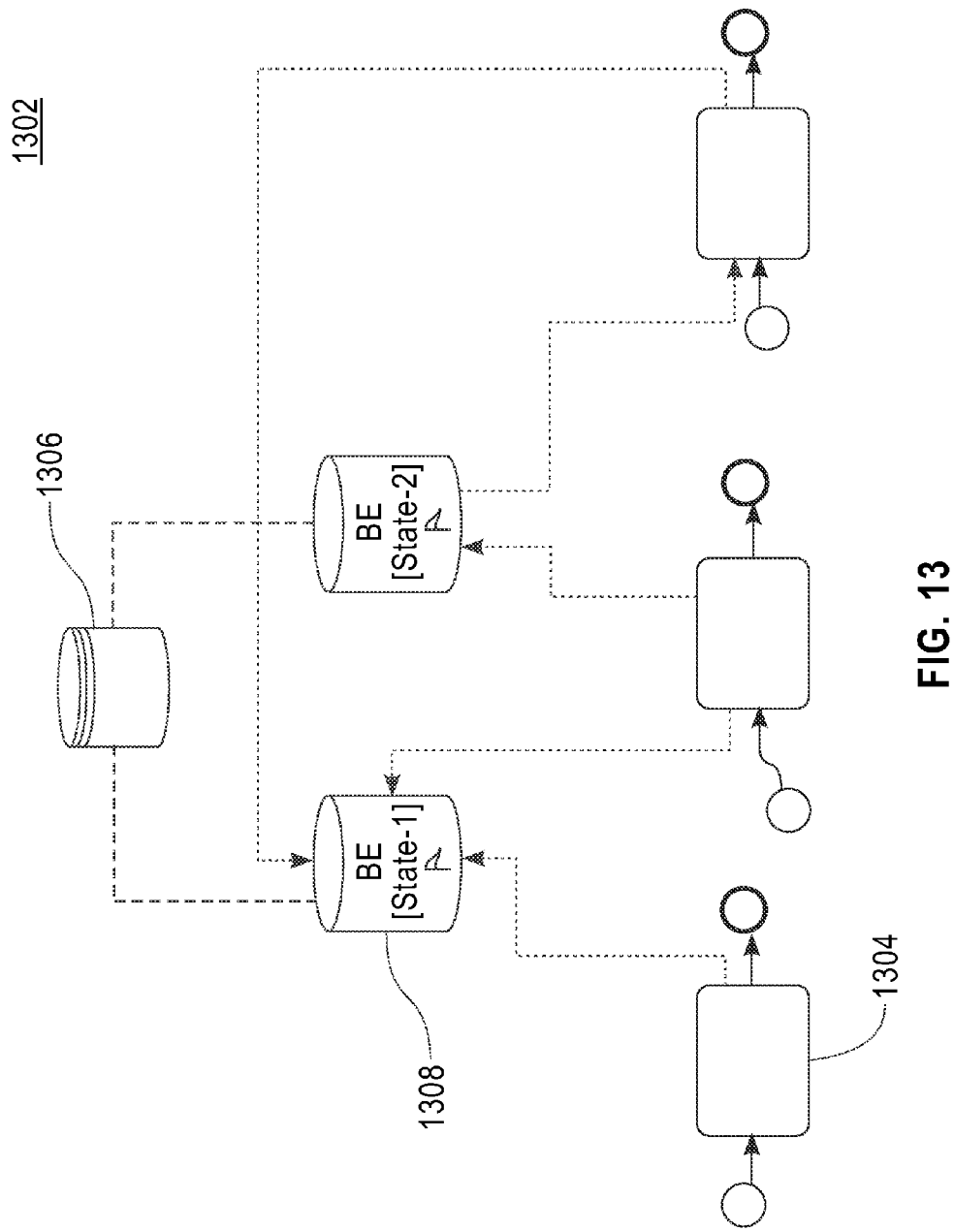
FIG. 13 shows an example embodiment of a visual representation of a lifecycle state associated with one or more process.

FIG. 13 shows an example embodiment of a visual representation 1302 of a lifecycle state associated with one or more processes 1304. At the top of the figure is a data store 1306, which holds data that may persist during one or more processes. At the bottom of the figure are three processes 1304. In the middle of the figure are two Business Entities milestones 1308. These milestones 1308 may represent Business Entities in specific lifecycle states. The milestones 1308 may be referenced from process tasks and start events. The processes 1304 may be governed by or implement the overall BE lifecycle represented by milestones 1308. The dotted lines between the milestones 1308 and data stores 1306 indicate that the BE refers to and provides additional information related to the data store. The dotted lines with arrows between the milestones 1308 and processes 1304 may indicate that the milestones, and hence, lifecycle states, are associated with the processes 1304 in various ways.

Conversion of the visual representation 1302 to a computer readable markup language may be accomplished by correlating the visual symbols of the representation with the syntax of the markup language to which the representation is converted. Those of ordinary skill in the art will recognize that the conversion process may differ for different markup languages.

Figure 14:
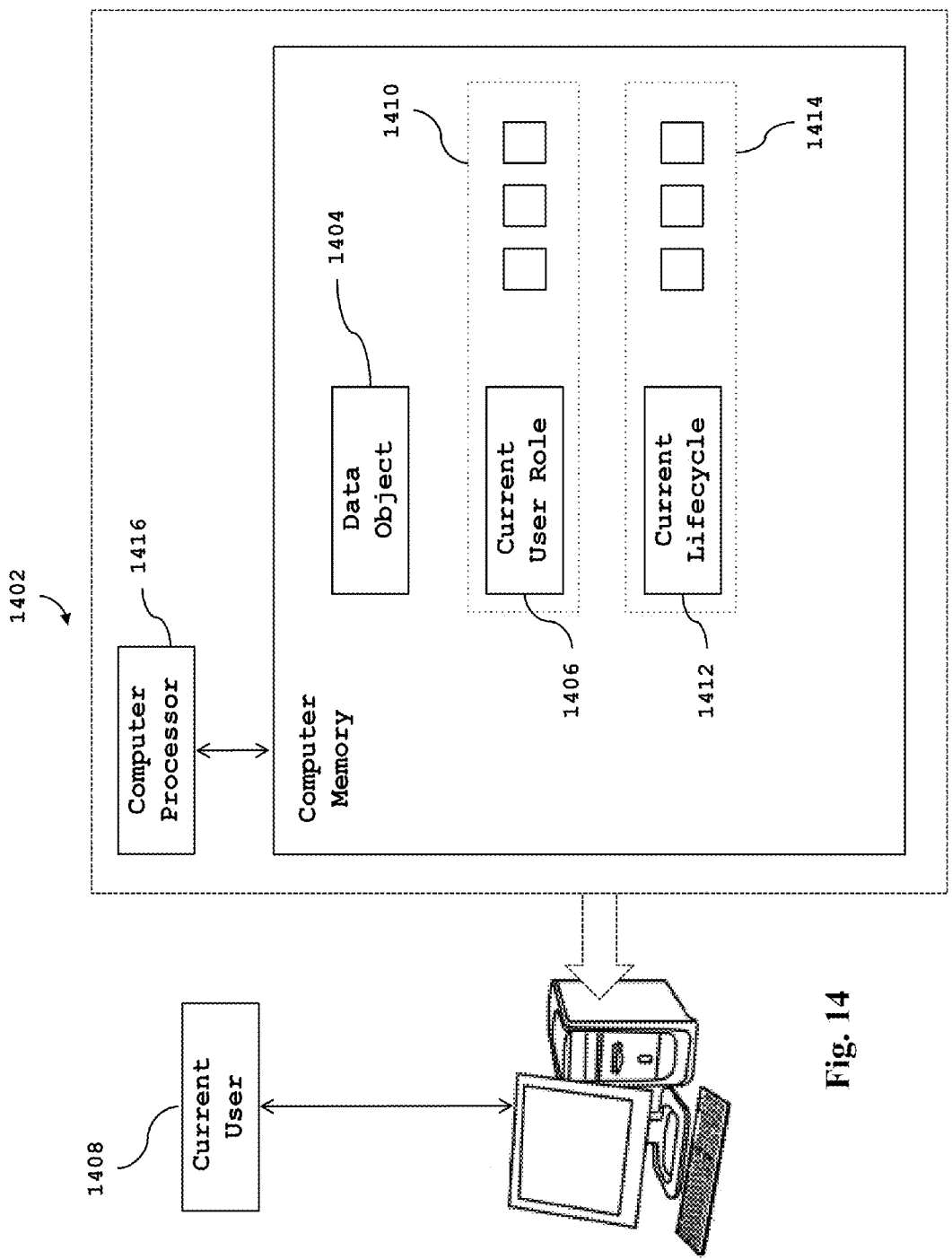
FIG. 14 shows an example embodiment of a system configured to control access to and manipulate a data object by different data object users.

FIG. 14 shows an example embodiment of a system 1402 configured to control access to and manipulate a data object 1404 by different data object users. The system 1402 may include a current user role 1406 of a current user 1408 requesting interaction with the data object 1404. The current user role 1406 may be one of a set of defined user roles 1410 for accessing and manipulating the data object users. The system 1402 may also include a current lifecycle state 1412 of the data object. The current lifecycle state 1412 may be one of a set of finite lifecycle states 1414 to which the data object 1404 can transition. The system 1402 may also include a computer processor 1416 configured to restrict interaction with the data object 1404 by the current user 1408 based on at least the current user role 1406 of the current user and the current lifecycle state 1412 of the data object. An example system may be implemented using Business Entities through BEDL along with WS-BPEL explained above.

In one embodiment, the set of user roles 1410 may be categories of agents that can access data associated with the data object 1404 and that can change the lifecycle states of the data object 1404. In another embodiment, the computer processor 1416, the data object 1404, data object user 1408, the set of lifecycle states 1414, and user roles 1410 may be together configured to control the implementation of a business process. In yet another embodiment the computer processor 1416 may be further configured to present a visual representation 1302, see FIG. 13, of a lifecycle state associated with one or more processes. The computer processor 1416 may also be configured to convert the visual representation 1302 into a computer readable markup language. Example visual representations and markup languages are described above.

Figure 15:
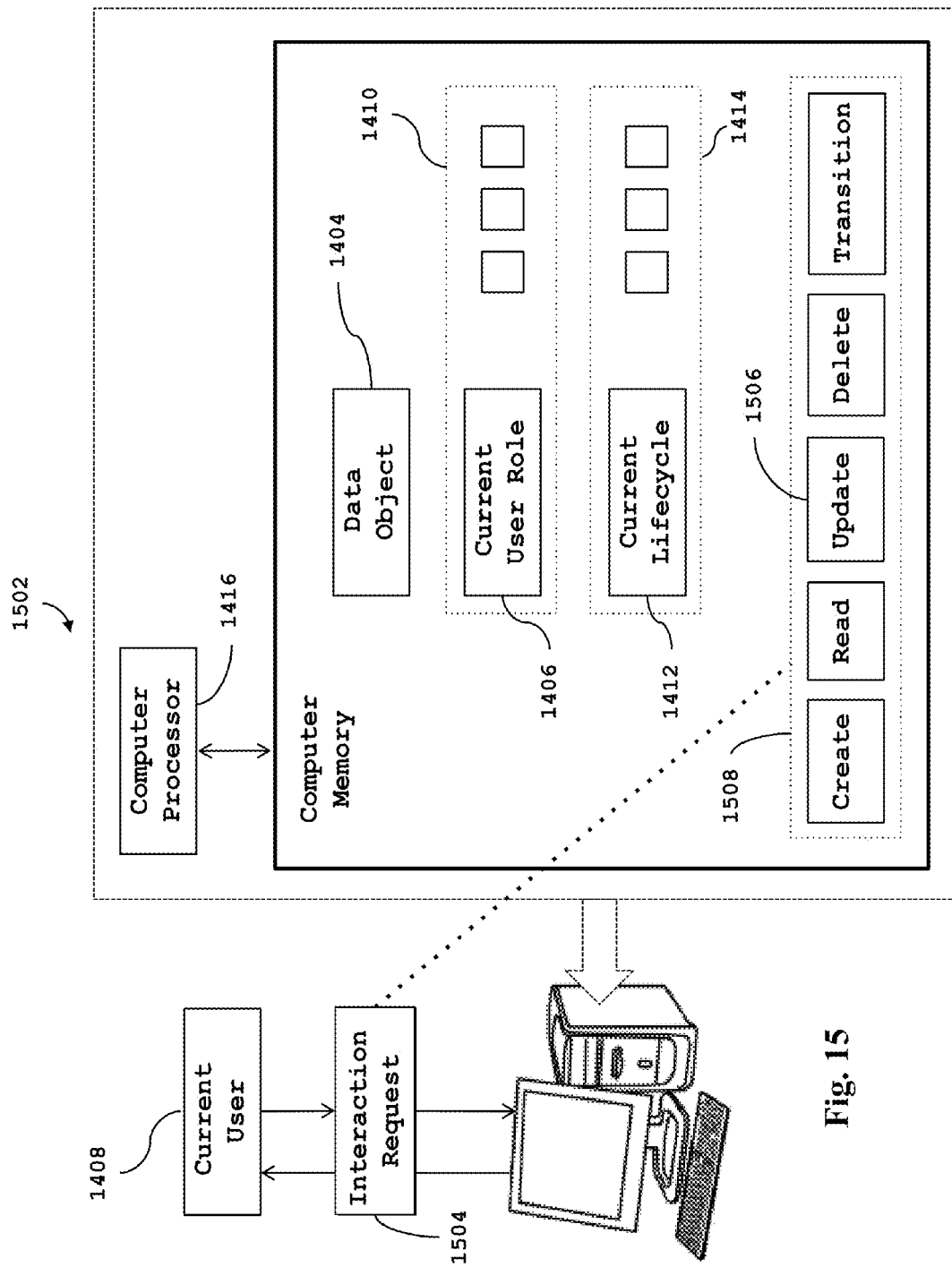
FIG. 15 shows an embodiment of the example system of FIG. 12 with an interaction request to interact with the data object by the current user.

FIG. 15 shows an embodiment of an example system 1502, which may include system 1402 and may also include an interaction request 1504 to interact with the data object 1404 by the current user 1408. The interaction request 1504 may include an interaction type 1506, which may be one of a set of interaction types 1508. Additionally, the computer processor 1416 may further be configured to restrict interaction with the data object 1404 by the current user 1408 based on the interaction type 1506 of the interaction request 1504. An example implementation of an interaction request using WS-BPEL, BEDL and BPEL4Data is described above.

In one embodiment, the set of interaction types 1508 may include: creating data associated with the data object, reading data associated with the data object, updating data associated with the data object, deleting data associated with the data object, and transitioning the data object to a different lifecycle state. These interaction types 1506 and how they may be implemented through Business Entities are described above.

Figure 16:
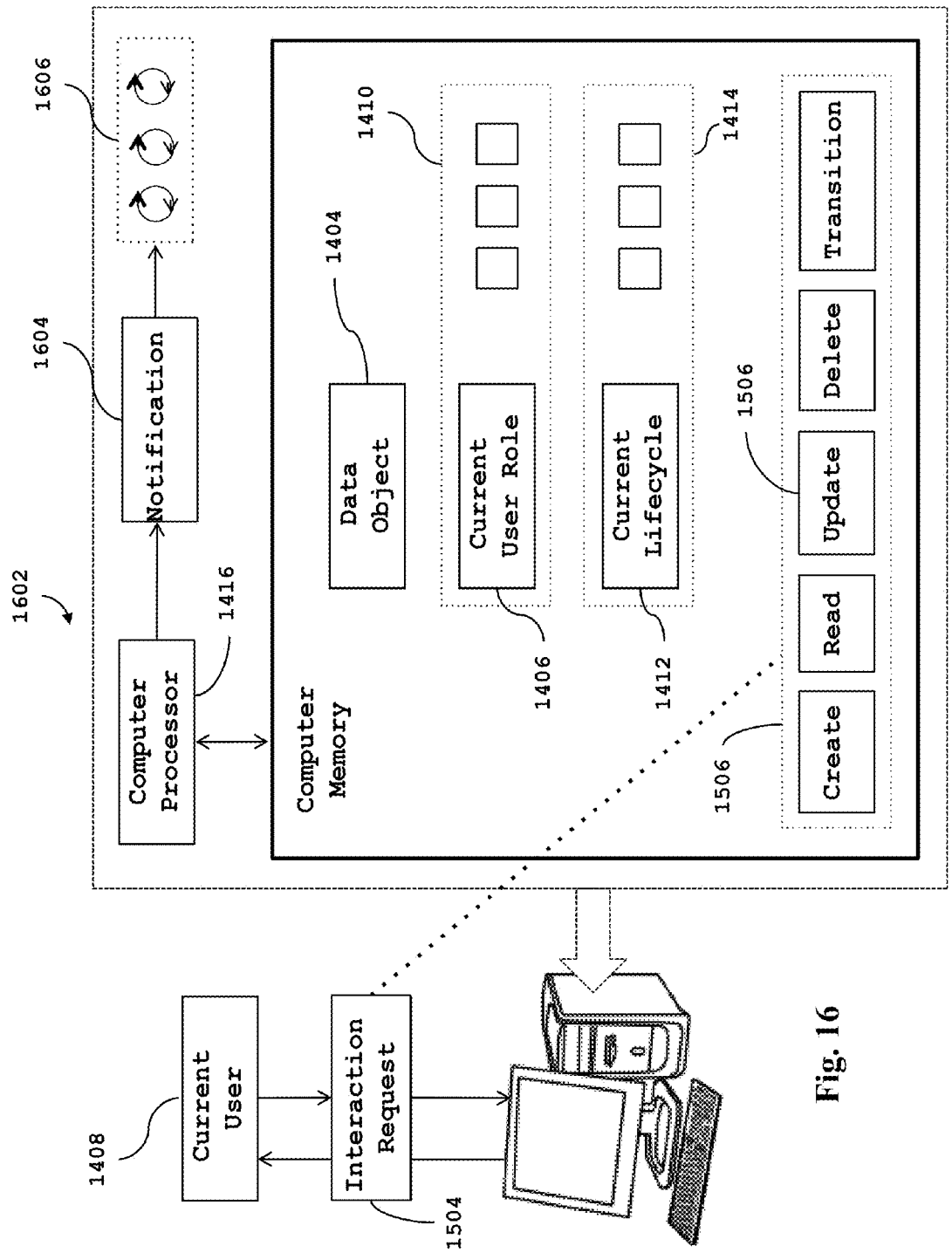
FIG. 16 shows an example embodiment of the system of FIG. 13 with a notification sent to a set of a computer processes.

FIG. 16 shows an example embodiment of a system 1602, which may include system 1502 and may also include a notification 1604 sent to a set of a computer processes 1606 to be notified when a data object user 1408 transitions the data object 1404 to a different lifecycle state. Additionally, the computer processor 1416 may be further configured to notify the set of computer processes 1606 when the data object user 1408 transitions the current lifecycle state 1412 of the data object 1404. An example of using BEDL to implement notifications is explained above.

Figure 17:
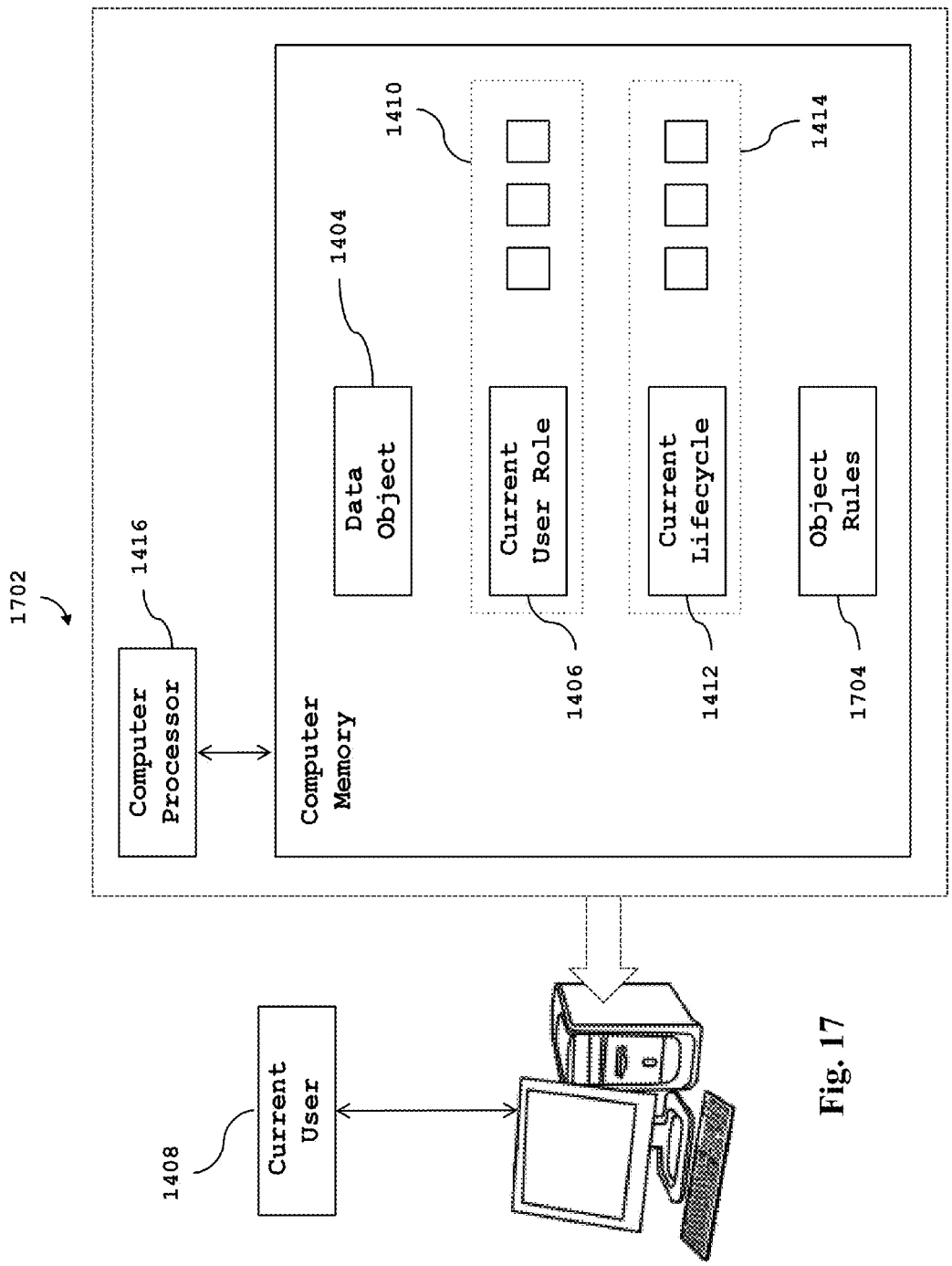
FIG. 17 shows an example embodiment of the system of FIG. 12 with a plurality of object rules for accessing and manipulating the data object.

FIG. 17 shows an example embodiment of a system 1702, which may include system 1402 and may also include a plurality of object rules 1704 for accessing and manipulating the data object 1404 based on the set of defined user roles 1410 and the set of finite lifecycle states 1414. Additionally, the computer processor may be further configured to restrict interaction with the data object 1404 by the current user 1408 by searching the object rules 1704 that apply to the current user role 1406 of the current user 1408 and the current lifecycle state 1412 of the data object 1404. An example implementation of the object rules (called access policies) through BEDL is described above.

In one embodiment of system 1702, the set of user roles 1410, set of lifecycle states 1414, and plurality of object rules 1704 are encoded and associated with the data object 1404 through a computer markup language. In another embodiment, the computer processor 1416 may be further configured to use a business process execution language, which language may be extended to incorporate the computer markup language. Examples of encoding and associating through a markup language called BEDL are discussed above, as well as an example way of using WS-BPEL and extending it to BEDL through BPEL4Data.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention have been described, it will be understood that those skilled in the art, both now and in the future, may make various improvements and enhancements that fall within the scope of the claims which follow. These claims should be construed to maintain the proper protection for the invention first described.

What is claimed is:

1. A method of controlling access to and manipulation of a data object in a computer system, the method comprising:
   determining a current user role of a current user requesting interaction with the data object, the current user role being one of a set of defined user roles for accessing the data object;

determining a current lifecycle state of the data object, the current lifecycle state being one of a set of states the data object can transition to;

restricting, by a computer processor, interaction with the data object by the current user based on at least the current user role of the current user and the current lifecycle state of the data object, the interaction including creating data associated with the data object, reading data associated with the data object, updating data associated with the data object, deleting data associated with the data object, and transitioning the data object to a different lifecycle state;

notifying a computer process when a data object user transitions the data object to a different lifecycle state;

receiving a plurality of object rules for accessing and manipulating the data object based on the set of defined user roles and a set of finite lifecycle states;

presenting a visual representation of a lifecycle state associated with one or more processes; and converting the visual representation into a computer readable markup language;

wherein restricting interaction with the data object by the current user includes searching the object rules that apply to the current user role of the current user and the current lifecycle state of the data object; and wherein the set of user roles, the set of lifecycle states, and plurality of object rules are encoded and associated with the data object.

2. The method of claim 1, further comprising:

receiving an interaction request to interact with the data object by the current user, the interaction request including an interaction type, the interaction type being one of a set of interaction types; and wherein restricting interaction with the data object by the current user is further based on the interaction type of the interaction request.

3. The method of claim 2, wherein the set of interaction types include creating data associated with the data object, reading data associated with the data object, updating data associated with the data object, deleting data associated with the data object, and transitioning the data object to the different lifecycle state.

4. The method of claim 1, wherein the set of user roles are categories of agents that can access data associated with the data object and that can change the lifecycle states of the data object.

5. The method of claim 1, wherein the set of user roles, the set of lifecycle states, and plurality of object rules are encoded and associated with a data object through a computer markup language.

6. The method of claim 5, further comprising organizing a set of processes using a language for executable business processes, the language for executable business processes being extended to incorporate the computer markup language.

7. The method of claim 1, wherein the computer processor, the data object, data object user, the set of lifecycle states, and user roles are together configured to control the implementation of a business process.

8. A system configured to control access to and manipulate a data object, the system comprising:

a computer processor configured to:

store a current user role of a current user requesting interaction with the data object, the current user role being one of a set of defined user roles for accessing the data object;

store a current lifecycle state of the data object, the current lifecycle state being one of a set of states the data object can transition to;

present a visual representation of a lifecycle state associated with one or more processes; and convert the visual representation into a computer readable markup language;

a notification sent to a set of a computer processes to be notified when a data object user transitions the data object to a different lifecycle state;

a plurality of object rules for accessing and manipulating the data object based on the set of defined user roles and a set of finite lifecycle states; and wherein the computer processor is further configured to restrict interaction with the data object by the current user by searching the object rules that apply to the current user role of the current user and the current lifecycle state of the data object;

wherein the set of user roles, set of lifecycle states, and plurality of object rules are encoded and associated with the data object; and wherein the computer processor is configured to restrict interaction with the data object by the current user based on at least the current user role of the current user and the current lifecycle state of the data object, the interaction including creating data associated with the data object, reading data associated with the data object, updating data associated with the data object, deleting data associated with the data object, and transitioning the data object to a different lifecycle state.

9. The system of claim 8, further comprising:

an interaction request to interact with the data object by the current user, the interaction request including an interaction type, the interaction type being one of a set of interaction types; and wherein the computer processor is further configured to restrict interaction with the data object by the current user based on the interaction type of the interaction request.

10. The system of claim 9, wherein the set of interaction types include creating data associated with the data object, reading data associated with the data object, updating data associated with the data object, deleting data associated with the data object, and transitioning the data object to the different lifecycle state.

11. The system of claim 10, wherein the computer processor is further configured to notify the set of computer processes when the data object user transitions the current lifecycle state of the data object.

12. The system of claim 8, wherein the set of user roles are categories of agents that can access data associated with the data object and that can change the lifecycle states of the data object.

13. The system of claim 8, wherein the set of user roles, set of lifecycle states, and plurality of object rules are encoded and associated with the data object through a computer markup language.

14. The system of claim 13, wherein the computer processor is further configured to use a business process execution language, the business process execution language being extended to incorporate the computer markup language.

15. The system of claim 8, wherein the computer processor, the data object, data object user, the set of lifecycle states, and user roles are together configured to control the implementation of a business process.

16. A computer program product for controlling access to and manipulation of a data object, the computer program product comprising:
- a non-transitory computer readable storage medium having computer readable program code embodied therewith, the computer readable program code configured to:
- determine a current user role of a current user requesting interaction with the data object, the current user role being one of a set of defined user roles for accessing the data object;
- determine a current lifecycle state of the data object, the current lifecycle state being one of a set of states the data object can transition to;
- restrict interaction with the data object by the current user based on at least the current user role of the current user and the current lifecycle state of the data object, the interaction including creating data associated with the data object, reading data associated with the data object, updating data associated with the data object, deleting data associated with the data object, and transitioning the data object to a different lifecycle state;
- notify a computer process when a data object user transitions the data object to a different lifecycle state;
- receive a plurality of object rules for accessing and manipulating the data object based on the set of defined user roles and a set of finite lifecycle states;
- restrict interaction with the data object by the current user by searching the object rules that apply to the current user role of the current user and the current lifecycle state of the data object;
- present a visual representation of a lifecycle state associated with one or more processes; and
- convert the visual representation into a computer readable markup language;
- wherein restricting interaction with the data object by the current user includes searching the object rules that apply to the current user role of the current user and the current lifecycle state of the data object; and
- wherein the set of user roles, the set of lifecycle states, and plurality of object rules are encoded and associated with the data object.

17. The computer program product claim 16, wherein the computer readable program code is further configured to:
- receive an interaction request to interact with the data object by the current user, the interaction request including an interaction type, the interaction type being one of a set of interaction types; and
- wherein restricting interaction with the data object by the current user is further based on the interaction type of the interaction request.

18. The computer program product of claim 17, wherein the set of interaction types include creating data associated with the data object, reading data associated with the data object, updating data associated with the data object, deleting data associated with the data object, and transitioning the data object to the different lifecycle state.

19. The computer program product of claim 16, wherein the computer readable program code is further configured to:
- restrict interaction with the data object by the current user by searching the object rules that apply to the current user role of the current user and the current lifecycle state of the data object.

* * * * *